(12) United States Patent
Gutierrez Keever et al.

(10) Patent No.: US 12,526,253 B1
(45) Date of Patent: Jan. 13, 2026

(54) SYSTEM AND METHOD FOR GRAPH-BASED CONVERSATIONAL-FLOW EDITING

(71) Applicant: Wishpond Technologies Ltd., Vancouver (CA)

(72) Inventors: Alabin Jordan Carel Gutierrez Keever, North Vancouver (CA); Ali Tajskandar, North Vancouver (CA); Luis Alejandro Medina Chávez, Querétaro (MX); Kara Raquel Kruzeniski, White Rock (CA)

(73) Assignee: Wishpond Technologies Ltd., Vancouver (CA)

( * ) Notice: Subject to any disclaimer, the term of this patent is extended or adjusted under 35 U.S.C. 154(b) by 0 days.

(21) Appl. No.: 19/311,451

(22) Filed: Aug. 27, 2025

(51) Int. Cl.
*H04L 51/216* (2022.01)
*G06F 16/332* (2019.01)
*H04L 51/02* (2022.01)

(52) U.S. Cl.
CPC ......... *H04L 51/216* (2022.05); *G06F 16/332* (2019.01); *H04L 51/02* (2013.01)

(58) Field of Classification Search
CPC ...... H04L 51/216; H04L 51/02; G06F 16/332
See application file for complete search history.

(56) References Cited

U.S. PATENT DOCUMENTS

| | | | | |
|---|---|---|---|---|
| 8,612,233 | B2 * | 12/2013 | Anand | H04M 3/4936 704/275 |
| 2012/0173243 | A1 * | 7/2012 | Anand | H04M 3/4936 704/270.1 |
| 2021/0097140 | A1 * | 4/2021 | Chatterjee | G06N 3/044 |
| 2021/0406473 | A1 * | 12/2021 | Park | H04L 51/02 |
| 2022/0308918 | A1 * | 9/2022 | Pandey | G06F 8/30 |

FOREIGN PATENT DOCUMENTS

CN 118171660 A 6/2024

* cited by examiner

*Primary Examiner* — Philip C Lee
(74) *Attorney, Agent, or Firm* — Jason A. Smith; Shumaker, Loop & Kendrick, LLP

(57) ABSTRACT

A system for creating and optimizing AI voice agents includes a non-transitory memory storing instructions and one or more processors coupled to the non-transitory memory and configured to execute the instructions to perform operations. The operations include providing a user interface having a sequence builder canvas and an AI assistant chat panel, receiving a natural language input describing a desired conversation flow for an AI voice agent via the AI assistant chat panel, generating one or more conversation steps based on the natural language input using an AI assistant, displaying the generated conversation steps as visual nodes within the sequence builder canvas, and executing validated backend actions for manipulating the conversation flow structure based on user inputs received via the AI assistant chat panel using a function calling architecture.

25 Claims, 4 Drawing Sheets

SYSTEM AND METHOD FOR GRAPH-BASED CONVERSATIONAL-FLOW EDITING

FIELD OF INVENTION

The present disclosure relates to conversational artificial intelligence systems, and more particularly to an integrated AI assistant for method for graph-based conversational-flow editing.

BACKGROUND

The creation of effective conversational AI agents for customer service and support presents significant technical challenges. These agents must be capable of understanding natural language inputs, maintaining context throughout a conversation, and providing accurate and helpful responses across a wide range of potential user inquiries and scenarios. Additionally, the agents need to seamlessly integrate with backend systems and databases to access relevant information and perform actions on behalf of users.

Currently, the development of conversational AI agents typically involves manual coding and configuration by specialized developers and data scientists. This process often requires creating complex dialog trees, defining intents and entities, and programming individual conversation flows. Natural language processing models must be trained on large datasets, and integration with backend systems needs to be carefully implemented. Testing and optimization of the agents is usually done through time-consuming trial-and-error processes.

However, existing approaches to conversational AI agent development face several limitations. The manual nature of the process makes it difficult to rapidly iterate and improve agents based on real-world performance. There is often a disconnect between the business users who understand the desired conversation flows and the technical teams implementing them. Additionally, optimizing prompts and refining conversation logic typically requires multiple cycles of testing and tweaking. The lack of integrated tools for building, testing, and deploying agents in a unified environment further complicates the development process and limits the ability to create truly dynamic and adaptive conversational experiences.

SUMMARY

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

According to an aspect of the present disclosure, a computer-implemented method for graph-based conversational-flow editing is provided. The method may comprise receiving, by a processor, an initial natural-language prompt that describes at least one conversational goal. The method may comprise generating, by the processor executing a unified flow-generation routine, a graph representation of a conversational sequence, each node of the graph being stored in memory as a record containing at least a node identifier and coordinates, and each directed edge being stored using identifiers that reference connected nodes. The method may comprise rendering, on a display in communication with the processor, nodes whose coordinates lie within a current viewport rectangle. The method may comprise receiving, via a user interface, a natural-language input specifying a modification to the conversational sequence. The method may comprise applying a modification, based on a natural-language input specifying the modification to the conversational sequence, by automatically determining coordinates for any new or moved node using a layout routine that enforces spatial separation, updating the corresponding node record, and storing a snapshot of the conversational sequence with an identifier in persistent storage.

According to other aspects of the present disclosure, the method may include one or more of the following features. The nodes may be stored as fixed-length records and the coordinates may be grid coordinates. The directed edges may be stored as pairs of node identifiers. The layout routine may comprise a force-directed solver that enforces a non-overlap constraint and Start-and-End anchor positions. Rendering may comprise re-rendering only a region of the viewport affected by the modification. The snapshot may be a compressed JSON snapshot. The identifier may be formed by hashing the compressed JSON snapshot and concatenating the hash with a timestamp. The method may further comprise grouping a subset of nodes into a collapsible container that is treated as a single node record in the generating, rendering, modifying, and storing steps. The method may further comprise queuing the natural-language input as a job in a lock-free circular buffer resident in shared memory. The method may further comprise indexing the job with an atomic fetch-and-add instruction. Graphics hardware may expose viewport clipping leveraged by the rendering and re-rendering. Each node of the graph record may contain integer grid coordinates. Validating any machine-generated data destined for insertion into the conversational sequence may comprise parsing the data with format-specific schema validators that dynamically adapt to JSON, XML, code snippets, or custom structures. An iterative refinement loop may identify deviations from the schema. The iterative refinement loop may formulate follow-up queries for a language model. The iterative refinement loop may obtain a revised output. The iterative refinement loop may repeat parsing until the data conforms to the schema and executes in a non-blocking asynchronous manner.

According to another aspect of the present disclosure, a system for graph-based conversational-flow editing is provided. The system may comprise a multi-core processor, a memory coupled to the processor, the memory storing node records, and a non-transitory computer-readable medium storing instructions that, when executed by the processor, cause the system to receive an initial natural-language prompt that describes at least one conversational goal, generate, by executing a unified flow-generation routine, a graph representation of a conversational sequence, each node of the graph being stored in the memory as a record containing at least a node identifier and coordinates, and each directed edge being stored using identifiers that reference connected nodes, render, on a display in communication with the processor, nodes whose coordinates lie within a current viewport rectangle, receive, via a user interface, a natural-language input specifying a modification to the conversational sequence, and apply a modification, based on a natural-language input specifying the modification to the conversational sequence, by automatically determining coordinates for any new or moved node using a layout routine that enforces spatial separation, updating the corresponding node record, and storing a snapshot of the conversational sequence with an identifier in persistent storage.

According to other aspects of the present disclosure, the system may include one or more of the following features. The node records may be fixed-length node records and the coordinates may be grid coordinates. The directed edges may be stored as pairs of node identifiers. The layout routine may comprise a force-directed solver that enforces a non-overlap constraint and Start-and-End anchor positions. Rendering may comprise re-rendering only a region of the viewport affected by the modification. Graphics hardware may be configured to draw only viewport-visible nodes. Graphics hardware may expose viewport clipping leveraged by the rendering and re-rendering. The system may further comprise a network interface configured to replicate compressed JSON snapshots across multiple storage nodes using a consensus protocol.

BRIEF DESCRIPTION OF FIGURES

Non-limiting and non-exhaustive examples are described with reference to the following figures.

DETAILED DESCRIPTION

Figure 1:
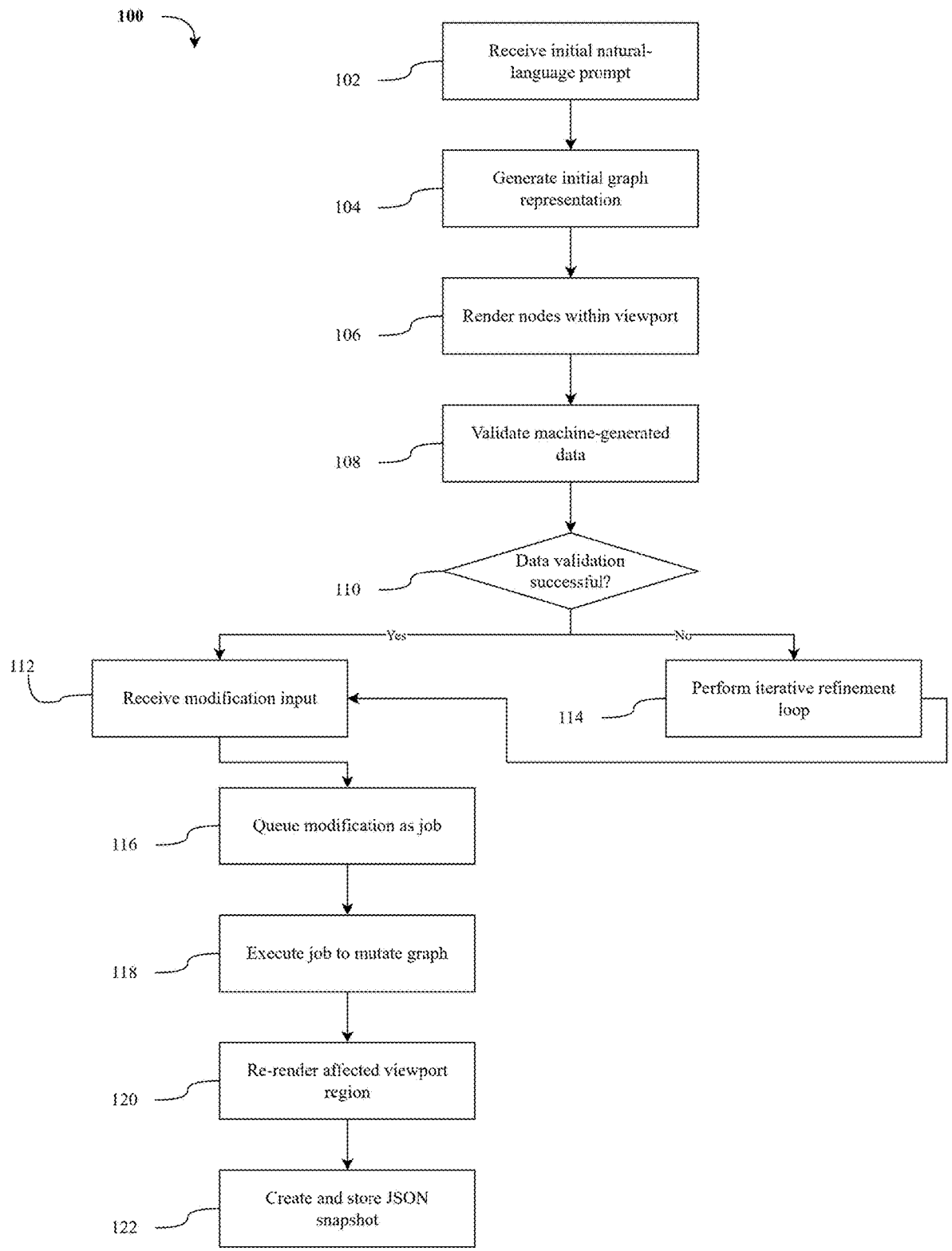
FIG. 1 illustrates a flowchart for constructing and editing conversational-flow sequences, according to aspects of the present disclosure.

The following description sets forth exemplary aspects of the present disclosure. It should be recognized, however, that such description is not intended as a limitation on the scope of the present disclosure. Rather, the description also encompasses combinations and modifications to those exemplary aspects described herein.

The present disclosure relates to systems and methods for creating, optimizing, and managing conversational agents through an integrated, conversational interface. The invention addresses the technical challenges associated with developing effective conversational AI systems, particularly the complexity and inefficiency of traditional agent creation processes.

Conventional approaches to building conversational agents often require users to navigate multiple disconnected tools, manually design conversation flows, and possess technical expertise in coding or prompt engineering. These limitations can result in time-consuming development cycles, suboptimal agent performance, and barriers to entry for non-technical users.

The disclosed invention provides a unified solution that streamlines the entire lifecycle of conversational agent development. By embedding an intelligent assistant directly within the sequence builder interface, the system enables users to create, edit, test, and refine conversation flows through natural language interactions. This approach significantly reduces the technical barriers associated with agent creation and allows for rapid iteration and optimization.

The conversational agent creation system may provide users with flexible creation pathways to accommodate different user preferences and workflows. In some embodiments, users may be presented with an initial choice between two creation modes: a Prompt-Based approach and a Sequence Builder approach. When selecting the Prompt-Based option, users may begin with a simple natural language description such as "Create an agent to qualify leads" and engage in an extended conversational refinement process with the AI assistant. During this prompt-based creation mode, the system may focus the user interface entirely on the conversational interaction, with the AI assistant guiding users through iterative questions and refinements to develop a comprehensive agent specification without displaying the visual sequence builder canvas. The assistant may ask clarifying questions about specific goals, target audiences, conversation flows, and desired outcomes, building the agent's structure internally based on the accumulated prompt information. This prompt-centric approach may appeal to users who prefer a more conversational, text-based interaction for agent creation. The system may present this choice between creation modes at the initial agent setup stage, allowing users to select their preferred development approach before beginning the agent creation process. Once the prompt-based creation is complete, users may optionally transition to the sequence builder view to make visual adjustments or continue working entirely within the conversational interface.

The system incorporates advanced features such as real-time flow generation, automated step optimization, and integrated testing capabilities. These components work in concert to provide a seamless experience for users, allowing them to focus on crafting effective conversational strategies rather than grappling with complex tools or technical implementations.

Furthermore, the invention addresses the challenge of maintaining consistency and traceability throughout the development process. By implementing robust version control and revision history features, the system ensures that all changes are logged and reversible, providing users with a comprehensive audit trail of their agent's evolution.

The disclosed technology represents a significant advancement in the field of conversational AI development, offering a more intuitive, efficient, and accessible approach to creating sophisticated conversational agents.

The method for constructing and editing conversational-flow sequences is illustrated in FIG. 1. FIG. 1 depicts a flowchart representing the process of creating and modifying conversational agents through a series of interconnected steps.

The process begins with a step 100 where an initial natural-language prompt is received. This prompt describes at least one conversational goal for the agent being created. Following the receipt of the prompt, a step 102 involves generating an initial graph representation of a conversational sequence. The generation utilizes a unified flow-generation routine. Each node of the graph is stored as a fixed-length record containing a node identifier, a node-type code, and grid coordinates. The edges of the graph are stored as pairs of node identifiers.

After the initial graph generation, a step 104 involves rendering nodes within a viewport. The rendering process selectively displays only those nodes whose coordinates lie within the current viewport rectangle. This approach optimizes the visual representation of the conversational sequence.

The method then proceeds to a step 106 where machine-generated data is validated. This validation step ensures the integrity and consistency of the data destined for insertion into the conversational sequence. If the validation is successful, the process moves to a step 110 where modification input is received. However, if the validation fails, the process branches to a step 112 where an iterative refinement loop is performed to address any data inconsistencies or errors.

A decision point 108 determines whether the validation was successful or not, directing the flow accordingly. Once any necessary refinements are completed, or if the initial validation was successful, the process converges at step 110 where modification input is received. This input typically comes in the form of natural-language specifications for changes to the conversational sequence.

Following the receipt of modification input, a step 114 involves queuing the modification as a job. This queuing mechanism allows for efficient processing of changes to the conversational sequence. The queued job is then executed in a step 116, which mutates the graph representation of the sequence.

After the graph mutation, a step 118 involves re-rendering the affected viewport region. This step ensures that any changes made to the conversational sequence are visually reflected in the user interface.

The process concludes with a step 120 where a compressed JSON snapshot of the conversational sequence is created and stored. This snapshot is associated with a unique identifier and saved in persistent storage, facilitating version control and allowing for future reference or rollback if needed.

This method provides a comprehensive approach to constructing and editing conversational-flow sequences, incorporating natural language processing, graph-based representation, data validation, and efficient rendering techniques to create a robust and user-friendly system for developing conversational agents.

Figure 2:
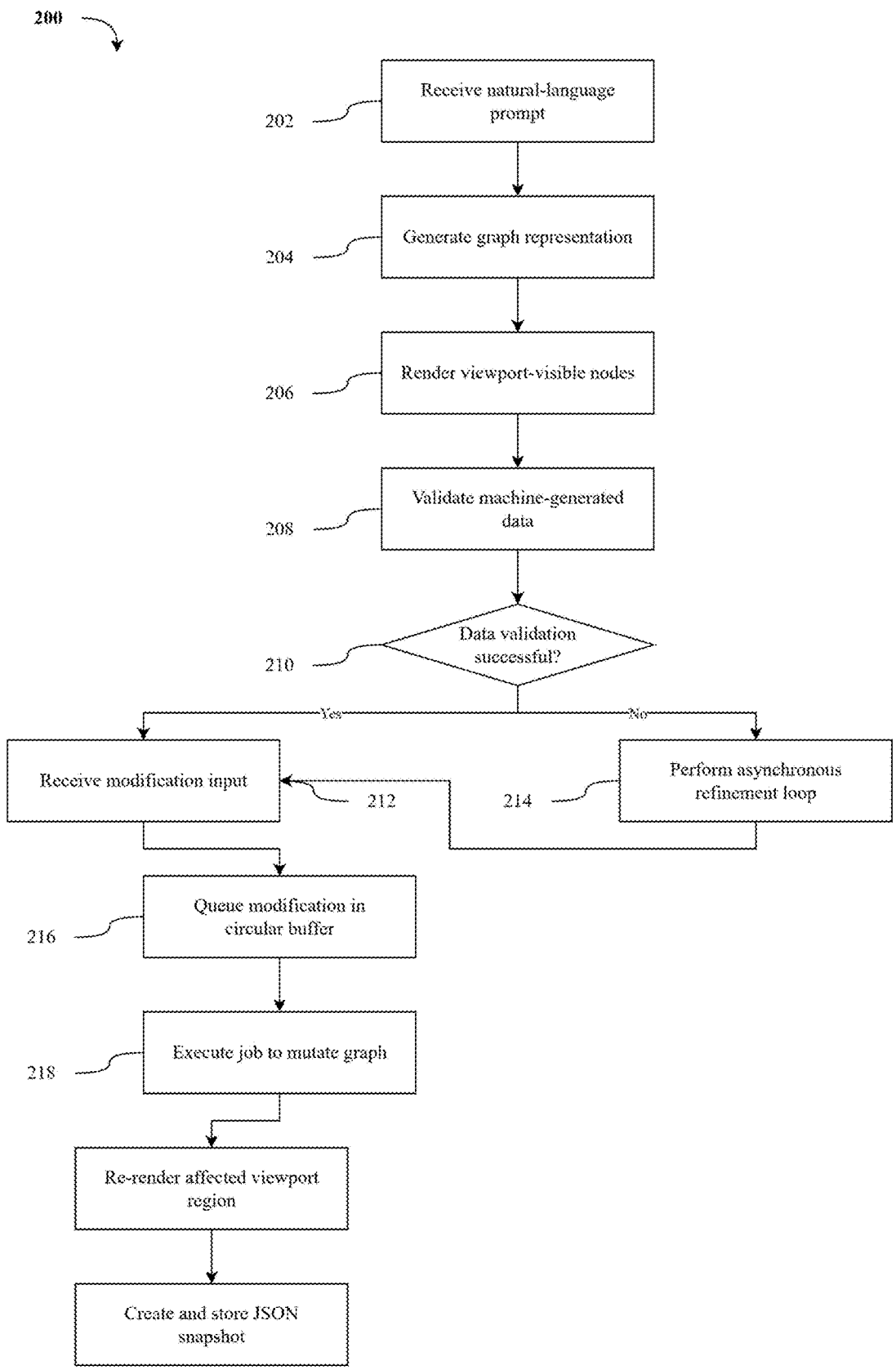
FIG. 2 depicts a flowchart for a computing system's operation in conversational-flow sequence management, according to an embodiment.

The computing system's operation for managing conversational-flow sequences involves a series of interconnected steps, as illustrated in FIG. 2. The process begins with the reception of a natural-language prompt, which serves as the initial input for creating or modifying a conversational sequence.

Upon receiving the prompt, the system generates a graph representation of the conversational sequence. This graph generation process utilizes a unified flow-generation routine that creates nodes and edges to represent the structure of the conversation. Each node in the graph is stored as a fixed-length record containing essential information such as a node identifier, a node-type code, and grid coordinates. The edges of the graph are represented by pairs of node identifiers, establishing the connections between different conversation elements.

Following the graph generation, the system renders the viewport-visible nodes on the display. This rendering process selectively displays only the nodes whose coordinates fall within the current viewport rectangle, optimizing the visual representation of the conversational sequence.

The system then proceeds to validate any machine-generated data intended for insertion into the conversational sequence. This validation process employs format-specific schema validators that dynamically adapt to various data structures, including JSON, XML, code snippets, or custom structures. The validators parse the data to ensure its integrity and conformity to the required schema.

In cases where the data fails validation, the system initiates an iterative refinement loop. This loop performs several functions: it identifies deviations from the schema, formulates follow-up queries for a language model, obtains revised output, and repeats the parsing process until the data conforms to the schema. The refinement loop operates in a non-blocking asynchronous manner, allowing the system to maintain responsiveness during the validation process.

The iterative refinement loop incorporates a library of error patterns and associated correction strategies. When encountering a validation failure, the system selects an appropriate strategy from this library and applies it during the refinement process. This approach enhances the efficiency and effectiveness of the data correction process.

Throughout the validation and refinement process, the system streams status updates to the user interface. These updates provide real-time feedback on the progress of the validation, ensuring that users are informed of the ongoing operations.

Once the data validation is complete or if the initial validation was successful, the system proceeds to receive modification input. This input typically comes in the form of natural-language specifications for changes to the conversational sequence.

Upon receiving a modification request, the system queues the modification as a job in a lock-free circular buffer. This buffer resides in shared memory and provides positional indices through a single atomic fetch-and-add instruction. The lock-free design of the circular buffer enhances concurrency and reduces contention in multi-threaded environments. In some implementations, the circular buffer is dimensioned to occupy a single processor cache line, optimizing memory access and improving overall system performance.

The system then executes the queued job to mutate the graph representation of the conversational sequence. This mutation process involves computing candidate grid-aligned coordinates for any new nodes using a force-directed solver. The solver enforces a non-overlap constraint and maintains Start-and-End anchor positions, ensuring a coherent and visually appealing layout of the conversation flow.

Once the force-directed solver computes a collision-free position for a new node, the system writes the coordinates into the fixed-length node record. This approach ensures that the graph maintains its structural integrity while accommodating new elements.

After the graph mutation is complete, the system re-renders the affected viewport region. This step ensures that any changes made to the conversational sequence are visually reflected in the user interface, providing immediate feedback to the user.

The final step in the process involves creating a compressed JSON snapshot of the conversational sequence. This snapshot is associated with a unique identifier and stored in persistent storage. The creation and storage of these snapshots facilitate version control and allow for future reference or rollback if needed.

The implementation of the iterative refinement loop utilizes asynchronous futures. This design choice prevents blocking of the user-interface thread, ensuring that the system remains responsive during intensive validation and refinement operations.

By incorporating these various components and processes, the computing system provides a robust and efficient approach to managing conversational-flow sequences. The system's ability to handle natural language inputs, generate and modify graph representations, validate data, and manage modifications in an asynchronous manner contributes to a seamless and responsive user experience in the creation and editing of conversational agents.

Figure 3:
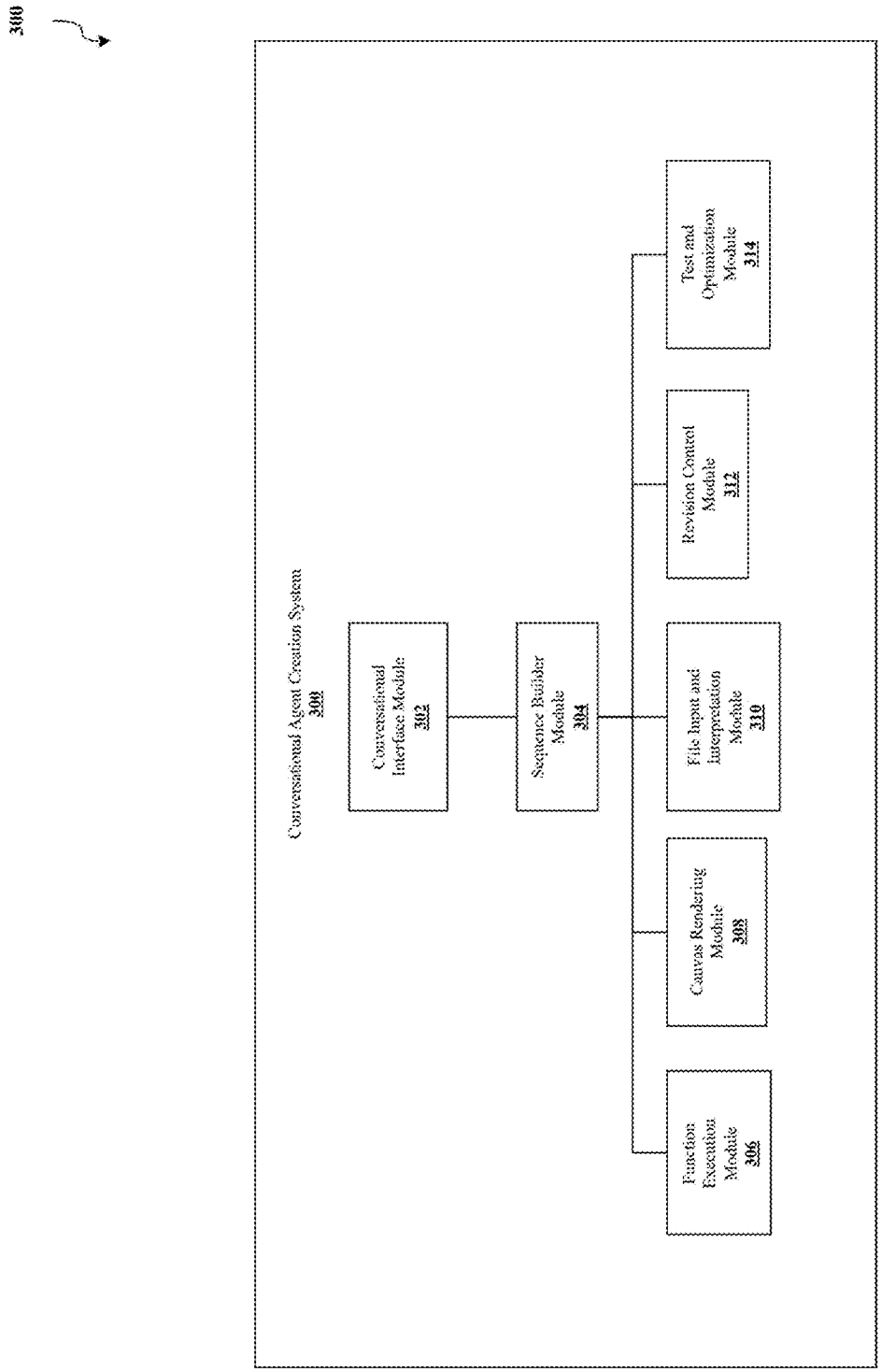
FIG. 3 shows a system diagram of a Conversational Agent Creation System, in accordance with example embodiments.

The Conversational Agent Creation System 300 depicted in FIG. 3 comprises a modular architecture designed to facilitate the creation and management of conversational agents. A Conversational Interface Module 302 serves as the primary point of interaction for users, accepting both natural language prompts and structured requests. The Conversational Interface Module 302 communicates directly with a Sequence Builder Module 304, which acts as the central coordination component for the system.

The Sequence Builder Module 304 interfaces with multiple specialized modules to handle various aspects of agent creation and management. A Function Execution Module 306 connects to the Sequence Builder Module 304 and carries out specific tasks or operations within the system. The Function Execution Module 306 processes requests from the Sequence Builder Module 304 and executes the necessary functions to modify or update the conversational agent's structure.

A Canvas Rendering Module 308 links to the Sequence Builder Module 304 and manages the visual representation of the conversational agent's flow. The Canvas Rendering Module 308 utilizes graphics hardware configured to draw only viewport-visible nodes, optimizing rendering performance and user interface responsiveness.

A File Input and Interpretation Module 310 connects to the Sequence Builder Module 304 and handles the processing of external files and data inputs. The File Input and Interpretation Module 310 interprets various file types, including image files such as hand-drawn flows, and creates sequences based on the uploaded content. This capability enhances the system's flexibility in accepting diverse input formats for agent creation.

A Revision Control Module 312 interfaces with the Sequence Builder Module 304 to manage version control and change history within the system. The Revision Control Module 312 allows users to view, compare, or restore any previous version of the canvas, providing comprehensive tracking and rollback capabilities for the agent development process.

A Test and Optimization Module 314 connects to the Sequence Builder Module 304 and performs testing and improvement functions for the conversational agents. The Test and Optimization Module 314 includes an 'optimize' button that analyzes test conversations and suggests improvements to the flow. Additionally, the Test and Optimization Module 314 features an 'Edit AI Prompt' function that allows users to edit prompts directly within steps, facilitating fine-tuning of the agent's responses.

The Sequence Builder Module 304 groups a subset of nodes into a collapsible container, which the system treats as a single node record in various operations. This feature enhances the organization and management of complex conversation flows within the agent structure.

The Conversational Agent Creation System 300 incorporates a multi-core processor, memory, and a non-transitory computer-readable medium. The memory stores fixed-length node records and a lock-free circular buffer, optimizing data storage and access for the system's operations.

A network interface within the Conversational Agent Creation System 300 replicates compressed JSON snapshots across multiple storage nodes using a consensus protocol. This feature ensures data consistency and reliability across distributed storage systems.

The Conversational Agent Creation System 300 includes a Knowledge Base Interaction and Enhancement feature for identifying gaps and improving responses. This capability allows the system to continuously refine and expand the agent's knowledge base, enhancing the quality and accuracy of conversational interactions.

Through the integration of these specialized modules and features, the Conversational Agent Creation System 300 provides a comprehensive and efficient platform for developing, testing, and optimizing conversational agents. The modular architecture allows for flexibility and extensibility, enabling the system to adapt to evolving requirements and technologies in the field of conversational AI.

Figure 4:
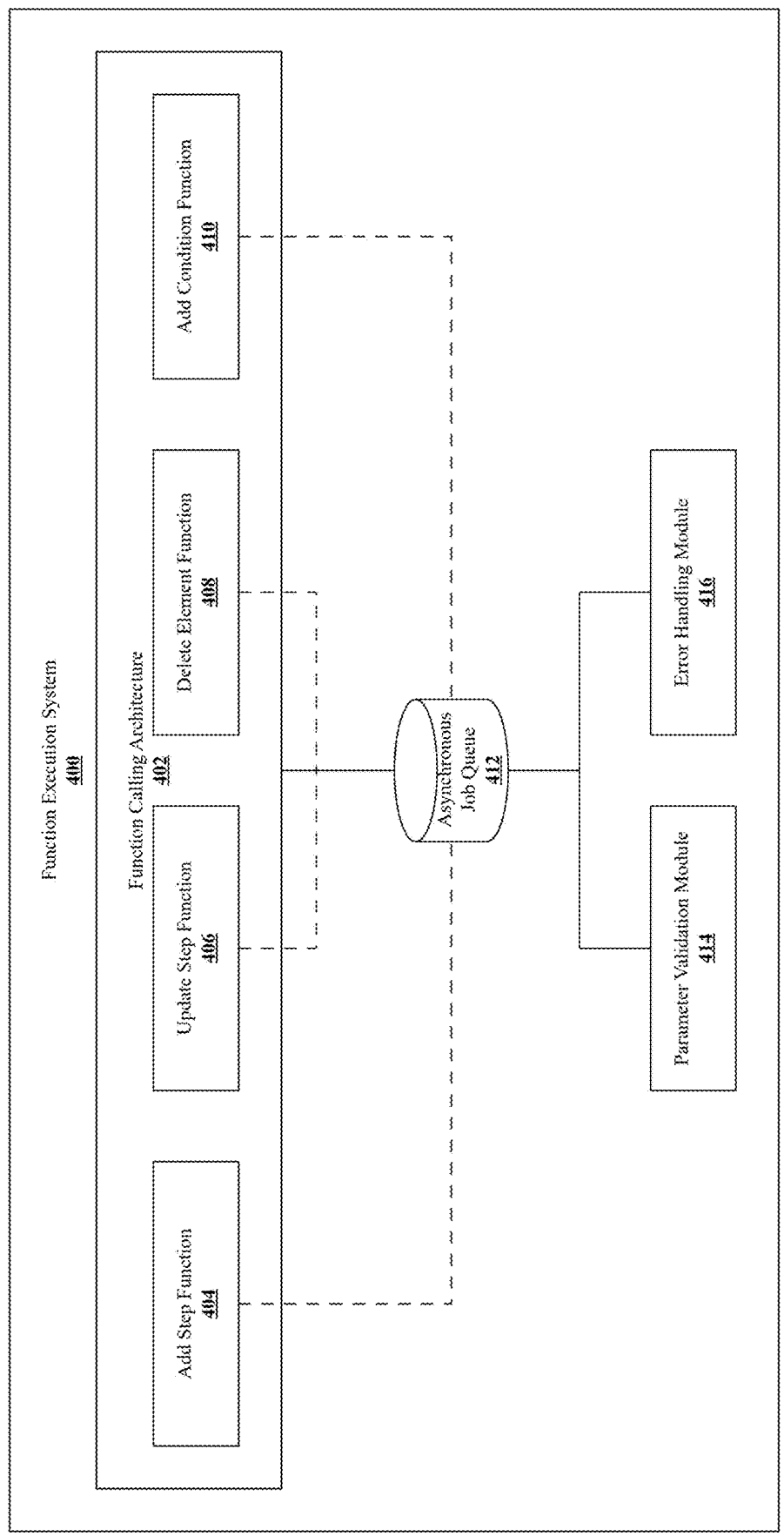
FIG. 4 illustrates a system diagram of a Function Execution System, according to aspects of the present disclosure.

The Function Execution System 400 illustrated in FIG. 4 comprises several interconnected components designed to manage and execute tasks efficiently within the Conversational Agent Creation System 300. A Function Calling Architecture 402 serves as the central component of the Function Execution System 400, orchestrating the execution of various functions essential to the operation of the conversational agent creation process.

The Function Calling Architecture 402 incorporates multiple function modules, each responsible for specific operations within the system. An Add Step Function 404 handles the creation and insertion of new steps into the conversational flow. An Update Step Function 406 manages modifications to existing steps, allowing for refinement of the agent's behavior. A Delete Element Function 408 removes unwanted elements from the conversation sequence, maintaining the flow's coherence. An Add Condition Function 410 introduces conditional logic into the conversation flow, enabling more complex and dynamic interactions.

In addition to these core functions, the Function Execution System 400 includes specialized functions for enhanced flow control and management. These functions comprise add_start_call_step, add_end_call_step, add_global_condition, send_back_to_origin, update_global_condition, move_element, rename_element, add_connection, delete_connection, and delete_all. Each of these functions contributes to the system's ability to create sophisticated and flexible conversational flows.

An Asynchronous Job Queue 412 interfaces with the Function Calling Architecture 402, managing the execution of tasks in a non-blocking manner. The Asynchronous Job Queue 412 ensures efficient processing of function calls by queuing them for execution, allowing the system to maintain responsiveness during complex operations.

A Parameter Validation Module 414 works in conjunction with the Asynchronous Job Queue 412 to verify the integrity and correctness of input parameters for each function call. The Parameter Validation Module 414 checks that all required parameters are present and conform to the expected format, reducing the risk of errors during task execution.

An Error Handling Module 416 operates alongside the Asynchronous Job Queue 412 and the Parameter Validation Module 414. The Error Handling Module 416 manages exceptions and errors that may occur during function execution, implementing appropriate recovery strategies and providing feedback to the system and users.

The Canvas Rendering Module 308 of the Conversational Agent Creation System 300 interacts closely with the Function Execution System 400. The Canvas Rendering Module 308 includes a layout engine that places nodes according to flow logic, avoiding overlaps and maintaining alignment. This layout engine ensures that the visual representation of the conversation flow remains clear and coherent as functions are executed and the flow structure evolves.

The Canvas Rendering Module 308 enforces visual flow rules, including the requirement that all agent sequences begin with a Start node and conclude with an End node. These rules provide a consistent structure to the conversation flows, enhancing readability and usability for users of the system.

Graphics hardware within the system exposes viewport clipping capabilities, which the Canvas Rendering Module 308 leverages to optimize rendering performance. This feature allows the system to efficiently display only the relevant portions of the conversation flow within the current viewport, enhancing the responsiveness of the user interface.

The Revision Control Module 312 of the Conversational Agent Creation System 300 works in tandem with the Function Execution System 400 to maintain a comprehensive history of changes to the conversation flow. The Revision Control Module 312 forms a unique identifier for each revision by hashing the compressed JSON snapshot of the flow state and concatenating the hash with a timestamp. This approach ensures that each revision is uniquely identifiable and traceable, facilitating version control and allowing users to review or revert changes as needed.

Through the integration of these components and modules, the Function Execution System 400 provides a robust and flexible framework for managing the complex operations involved in creating and modifying conversational agents. The system's architecture enables efficient task execution, error handling, and version control, supporting the development of sophisticated and dynamic conversation flows within the Conversational Agent Creation System 300.

The system architecture for creating, optimizing, and managing conversational agents comprises several interconnected components that work in concert to provide a unified environment for agent development. The core components include a conversational interface, a sequence builder, a function execution system, and a canvas rendering engine.

The conversational interface serves as the primary point of interaction for users. This interface allows users to input natural language commands and descriptions, which are then interpreted and translated into actionable instructions for the system. The conversational interface incorporates natural language processing capabilities to understand user intent and context, enabling a more intuitive and accessible approach to agent creation.

Integrated with the conversational interface, the sequence builder component manages the structural representation of the conversational agent's conversation flow. The sequence builder interprets user inputs and translates them into a visual representation of the agent's logic, including conversation steps, decision points, and branching paths. This component maintains the logical structure of the agent, ensuring that user-defined conversation flows are accurately represented and can be easily modified or expanded.

The function execution system forms the backbone of the architecture, handling the translation of user inputs and system actions into concrete modifications of the agent's structure and behavior. This system employs a set of predefined functions that correspond to specific operations within the agent creation process, such as adding steps, updating conditions, or modifying prompts. The function execution system validates inputs, manages the execution of these functions, and ensures that changes are applied consistently across the agent's structure.

Working in tandem with the sequence builder, the canvas rendering engine is responsible for the visual representation of the agent's conversation flow. This component takes the logical structure defined by the sequence builder and renders it as an interactive, graphical representation on the user interface. The canvas rendering engine incorporates layout algorithms to optimize the placement and arrangement of conversation nodes, ensuring clarity and readability in the visual representation of complex agent structures.

These components operate within a unified environment, allowing for seamless interaction and real-time updates across the system. When a user provides input through the conversational interface, the system processes this input, determines the appropriate actions, and coordinates the execution of these actions across the relevant components. For example, a user request to add a new conversation step triggers a series of coordinated actions: the conversational interface interprets the request, the function execution system validates and processes the corresponding function calls, the sequence builder updates the logical structure of the agent, and the canvas rendering engine reflects these changes in the visual representation.

The architecture incorporates asynchronous processing capabilities to maintain responsiveness and handle complex operations efficiently. This allows the system to manage multiple tasks concurrently, such as processing user inputs, executing functions, and updating the visual representation, without introducing significant delays or interruptions to the user experience.

To support the iterative nature of agent development, the system includes comprehensive version control and revision tracking mechanisms. These features enable users to review, compare, and revert changes made throughout the development process, providing a robust framework for experimentation and refinement of agent behaviors.

The integration of these components within a unified architecture addresses the challenges associated with traditional approaches to conversational agent development. By providing a cohesive environment that combines natural language interaction, visual representation, and powerful backend processing, the system enables users to focus on crafting effective conversational strategies rather than navigating disparate tools or grappling with technical complexities.

The conversational interface serves as the primary point of interaction between users and the conversational agent creation system. This interface incorporates advanced natural language processing capabilities to interpret user inputs, understand intent, and generate appropriate responses. The system utilizes deep learning models trained on vast corpora of conversational data to accurately parse and comprehend user commands, queries, and descriptions. It is important to note that all natural language processing and large language model inference runs in a backend service; the browser UI consumes only validated JSON and never hosts deep-learning models locally.

When a user interacts with the conversational interface, the system first tokenizes the input text, breaking it down into individual words and phrases. These tokens are then processed through multiple layers of neural networks, including recurrent neural networks (RNNs) and transformer-based architectures, to extract semantic meaning and contextual information. The system employs techniques such as named entity recognition, part-of-speech tagging, and dependency parsing to further enhance its understanding of the user's intent.

The conversational interface utilizes a sophisticated prompt interpretation mechanism to translate user inputs into actionable instructions for the conversational agent creation process. This mechanism analyzes the semantic structure of the input, identifies key concepts and relationships, and maps them to predefined system functions and operations. For example, when a user expresses a desire to create a new conversation step, the system recognizes this intent and triggers the appropriate function calls to add the step to the agent's structure.

Response generation within the conversational interface is handled by a combination of retrieval-based and generative models. The system maintains a knowledge base of common user queries and corresponding responses, allowing for quick and accurate replies to frequently asked questions or standard commands. For more complex or novel inputs, the system employs generative language models to produce contextually appropriate responses. These models take into account the current state of the agent being developed, the user's interaction history, and the specific details of the input to generate relevant and helpful responses.

The conversational interface supports a wide range of user interactions, from high-level instructions to detailed modifications of agent behavior. Users can provide natural language descriptions of desired conversation flows, which the system then translates into structured sequences of steps and decision points. For instance, a user might input: "Create a greeting sequence that asks for the customer's name and then offers assistance." The system processes this input, identifies the key components (greeting, asking for name, offering assistance), and generates the corresponding steps in the agent's structure.

Users can also make specific requests for modifications or optimizations to existing agent structures. For example, a user might say: "Make the tone of the third step more casual." The system interprets this command, locates the relevant step in the agent's structure, and applies natural language generation techniques to rephrase the step's content in a more casual tone while preserving its functional intent.

The conversational interface incorporates context-awareness to maintain coherence across multiple user interactions. It tracks the current state of the agent being developed, remembers previous user inputs and system responses, and uses this information to interpret subsequent commands and generate appropriate responses. This allows for more natural and efficient interactions, as users can refer back to previous steps or make incremental changes without needing to restate the entire context.

Error handling and clarification mechanisms are built into the conversational interface to address ambiguous or incomplete user inputs. When the system encounters an input it cannot confidently interpret, it generates clarifying questions to gather additional information from the user. For instance, if a user requests to "add a condition" without specifying which step the condition should be applied to, the system might respond with: "To which step would you like to add the condition?"

The conversational interface also provides explanations and suggestions to guide users through the agent creation process. It can offer recommendations for improving conversation flows, suggest alternative phrasings for prompts, or explain the potential impact of certain changes on the agent's behavior. This proactive assistance helps users make informed decisions and create more effective conversational agents.

Integration with the broader conversational agent creation system allows the conversational interface to provide real-time feedback on changes made to the agent's structure. As users interact with the interface to modify the agent, the system updates the visual representation of the conversation flow and provides immediate confirmation of applied changes. This tight coupling between natural language interaction and visual feedback enhances the user's understanding of the agent's structure and facilitates iterative refinement.

The conversational interface employs continuous learning techniques to improve its performance over time. It analyzes user interactions, identifies patterns in successful agent creation processes, and refines its language understanding and generation capabilities. This ongoing optimization ensures that the interface becomes increasingly adept at interpreting user intent and providing relevant assistance in the conversational agent creation process.

The sequence builder component of the system incorporates sophisticated mechanisms for managing the visual representation and logical structure of conversational agent conversation flows. This component works in conjunction with a canvas rendering engine to provide users with an intuitive, interactive interface for creating and modifying agent behaviors.

The canvas rendering engine employs advanced layout algorithms to optimize the placement and arrangement of conversation nodes within the visual workspace. These algorithms take into account factors such as node size, connection complexity, and overall flow direction to generate clear, readable representations of even complex agent structures. The engine continuously monitors the canvas state and dynamically adjusts node positions to maintain optimal spacing and alignment as users add, remove, or modify elements of the conversation flow.

Node placement within the canvas adheres to a set of predefined rules and constraints to ensure consistency and clarity in the visual representation. The system enforces a top-down flow orientation, with conversation steps generally progressing from top to bottom of the canvas. Horizontal spacing between nodes is automatically calculated to provide sufficient room for labels and connection lines while minimizing unnecessary white space.

The sequence builder implements a robust node validation system to maintain the integrity of the conversation flow structure. This system performs real-time checks on node placement, connection validity, and overall flow logic. When a new node is added or an existing node is moved, the validation system verifies that the placement does not overlap with other elements and remains within the bounds of the canvas. If an invalid placement is detected, the system automatically repositions the node to the nearest valid location, ensuring that the visual representation remains clear and coherent.

Connection management forms a critical aspect of the sequence builder's functionality. The system supports the creation of both linear and non-linear conversation paths, allowing users to define complex decision trees and conditional logic within their agent flows. When users establish connections between nodes, the sequence builder validates the logical consistency of these connections, preventing circular references or invalid branching structures that could lead to runtime errors in the agent's behavior.

The sequence builder enforces a set of visual flow rules to enhance the clarity and consistency of agent representations. A fundamental rule mandates that all agent sequences must begin with a designated Start node and conclude with an End node. These nodes serve as clear visual indicators of the conversation's entry and exit points, helping users quickly understand the overall structure of the agent flow. The system automatically inserts these nodes when a new agent is created and prevents their deletion or disconnection from the main flow.

To further enhance the visual organization of complex agent structures, the sequence builder supports the creation of grouped nodes or subflows. This feature allows users to encapsulate related conversation steps within a single visual element, reducing clutter on the main canvas while maintaining the ability to expand and edit the grouped elements as needed. The system applies specialized layout algorithms to these grouped nodes, ensuring that their internal structure is optimized for clarity when expanded. Users can collapse these grouped nodes to simplify the visual representation of complex flows, and expand them when detailed editing is required. This node grouping capability enables the creation of reusable conversation patterns that can be applied across multiple agents or sections of a single agent.

The sequence builder incorporates a dynamic zoom and pan functionality, enabling users to navigate large or complex agent structures efficiently. As users zoom in or out, the canvas rendering engine adjusts the level of detail displayed for each node, showing more or less information based on the current zoom level. This adaptive display helps maintain readability and performance when working with extensive conversation flows.

To support the iterative nature of agent development, the sequence builder implements a robust undo/redo system. This feature tracks all modifications made to the agent structure, allowing users to revert changes or restore previous states of the conversation flow. The undo/redo functionality is deeply integrated with the canvas rendering engine, ensuring that visual updates are smoothly applied as users navigate through the history of their edits.

The sequence builder also provides advanced search and navigation capabilities within the canvas. Users can quickly locate specific nodes or conversation paths using keyword searches or by filtering based on node types or attributes. The system highlights matching elements within the canvas and offers shortcuts for jumping between search results, facilitating efficient navigation and editing of large agent structures.

Integration with the broader conversational agent creation system allows the sequence builder to reflect changes made through other interfaces in real-time. For example, when users modify agent behavior through the conversational interface, the sequence builder automatically updates the visual representation to reflect these changes. This tight coupling ensures consistency across all aspects of the agent development process and provides immediate visual feedback on the impact of user actions.

The sequence builder employs efficient data structures and rendering techniques to maintain responsiveness even when working with complex agent structures containing hundreds of nodes. The system uses a combination of virtual scrolling and selective rendering to optimize performance, loading and displaying only the portions of the canvas currently visible to the user while maintaining the logical structure of the entire agent in memory.

The auto-layout geometry governance feature of the sequence builder provides sophisticated control over the visual organization of conversation flows. This layout engine automatically places nodes according to a set of predefined rules and constraints, ensuring optimal spacing, alignment, and visual clarity. The engine enforces a non-overlap rule, preventing nodes from occupying the same space or intersecting with one another. It also maintains mandatory Start and End anchors at the beginning and end of the flow, providing clear visual indicators of the conversation's entry and exit points. Nodes can be aligned to a grid or positioned using force-directed layout algorithms, which simulate physical forces to achieve aesthetically pleasing and functionally clear arrangements. This automated layout capability significantly reduces the manual effort required to organize complex conversation flows and ensures consistent visual representation across different agents and user sessions.

The function execution and backend orchestration system forms a critical component of the conversational agent creation platform, enabling the translation of user intentions into concrete modifications of the agent's structure and behavior. This system employs a sophisticated function calling architecture that defines a set of specific operations that can be performed on the agent's conversation flow.

The function calling architecture incorporates a comprehensive set of functions, each corresponding to a distinct operation within the agent creation process. These functions include get_agent_details for retrieving information about the current state of the agent, add_step for inserting new conversation nodes, update_step for modifying existing steps, delete_element for removing components from the flow, add_condition for introducing decision points, and various other functions for manipulating the agent's structure. The system also includes bidirectional assistant calls, where the assistant not only writes to the flow through create, read, update, and delete (CRUD) operations but also reads the current flow state through dedicated "get_" functions such as get_agent_details, get_step_details, and get_flow_structure. This bidirectional capability enables the assistant to provide context-aware suggestions and modifications based on the current state of the conversation flow.

Each function within the architecture adheres to a strict schema and parameter structure, ensuring that inputs are fully validated before execution. The system implements rigorous parameter validation checks to maintain data integrity and prevent inconsistencies in the agent's structure. For instance, the add_step function requires parameters such as name, description, step_details, and positional coordinates (pos_x, pos_y). The system validates these inputs to ensure they conform to expected formats and value ranges before proceeding with the operation.

To manage the execution of these functions efficiently and reliably, the system employs an asynchronous job queue. When a function call is initiated, either through user interaction or system-generated events, the operation is not executed immediately. Instead, it is encapsulated as a job and placed into the asynchronous queue for processing.

The asynchronous job queue serves several crucial purposes in the backend orchestration process. First, it decouples the user interface from the potentially time-consuming operations of modifying the agent's structure, ensuring that the system remains responsive to user inputs. Second, it allows for better management of system resources by controlling the rate at which operations are executed and preventing overload during periods of high activity.

Upon entering the job queue, each function call undergoes a series of processing steps. The system first validates all input parameters and the overall command context to ensure that the operation is permissible given the current state of the agent. If any validation checks fail, the job is rejected, and an appropriate error message is generated for user feedback.

For jobs that pass validation, the system proceeds with execution based on the specific function and the current agent configuration. This execution phase involves updating the internal representation of the agent's structure, modifying database records, and generating any necessary auxiliary data structures to support the operation.

Throughout the execution process, the system monitors job status and handles error reporting. If any issues arise during execution, such as conflicts with concurrent operations or unexpected data states, the system generates detailed error logs and, where possible, attempts to roll back changes to maintain consistency in the agent's structure.

As jobs are processed and completed, the system streams execution results back to the user interface in real-time. This streaming approach allows for immediate visual feedback on canvas updates, node creation, step deletion, and other structural changes, enhancing the user's ability to track and understand modifications to the agent's flow.

The asynchronous job queue also facilitates the management of complex, multi-step operations that require coordination across different components of the system. For example, when a user requests a significant restructuring of the agent's flow, the system breaks down this request into a series of atomic operations, each represented as a separate job in the queue. These jobs are then executed in a coordinated sequence, ensuring that dependencies between operations are respected and that the overall integrity of the agent's structure is maintained.

To further enhance reliability and consistency, the system implements transactional behavior for related sets of operations. When multiple function calls are part of a logical unit of work, such as adding a new conversation branch with multiple steps and conditions, these operations are grouped into a transaction. The system ensures that either all operations within the transaction complete successfully, or none of them are applied, preventing partial updates that could lead to inconsistent agent states.

The function execution and backend orchestration system also incorporates mechanisms for handling concurrent modifications to the agent's structure. When multiple users or system processes attempt to modify the same agent simultaneously, the system employs locking mechanisms and conflict resolution strategies to maintain data consistency. These concurrency safeguards include multi-user locking or transactional queues that prevent race conditions and guarantee state consistency. For example, when a user begins editing a specific section of the conversation flow, that section may be temporarily locked to prevent conflicting changes from other users. Alternatively, the system may implement optimistic concurrency control, allowing multiple users to make changes simultaneously but validating these changes against the current state of the agent before applying them. These mechanisms prevent conflicting changes from being applied and ensure that users always interact with the most up-to-date version of the agent's structure.

By implementing this robust function execution and backend orchestration system, the conversational agent creation platform provides a powerful and reliable foundation for translating user intentions into concrete agent behaviors. The combination of a well-defined function calling architecture, rigorous parameter validation, and an efficient asynchronous job queue enables the system to handle complex agent modifications with high reliability and responsiveness, supporting the creation of sophisticated and dynamic conversational flows.

The conversational agent creation system implements a sophisticated output validation and refinement pipeline to ensure seamless integration between the AI assistant and the sequence builder components. This pipeline employs a multi-stage verification process that rigorously analyzes the structure, format, and content of AI-generated outputs before allowing them to propagate through the system.

Upon receiving output from the AI assistant's backend language models, the validation pipeline first applies a series of format-specific parsers and schema validators. These validators dynamically adapt to the expected output type, whether it be JSON, XML, code snippets, or custom data structures. The parsers attempt to interpret the received data according to predefined schemas, flagging any structural inconsistencies or syntax errors.

If the initial validation fails, the system activates its iterative refinement module. This module employs natural language processing techniques to analyze the non-compliant output, identifying specific areas of deviation from the expected format. It then generates targeted follow-up queries or instructions for the AI assistant, effectively guiding it towards producing the correct output format.

The refinement process utilizes a feedback loop mechanism, where each iteration informs the subsequent request to the AI assistant. This approach allows the system to progressively narrow down discrepancies and converge on a compliant output. To optimize this process, the system maintains a dynamic library of common error patterns and corresponding correction strategies, which it applies in real-time during the refinement cycle.

Throughout the validation and refinement process, the system employs non-blocking asynchronous operations to maintain responsiveness. This architecture ensures that the user interface remains interactive while complex validation tasks execute in the background. The system provides real-time status updates to users, indicating when validation is in progress and when refined outputs are ready for integration into the sequence builder.

By enforcing strict output compliance before data propagation, the system significantly reduces the likelihood of downstream errors in the sequence builder and other dependent components. This proactive approach to data integrity enhances the overall reliability and consistency of the conversational agent creation process, allowing for more complex and sophisticated agent structures to be developed with reduced risk of structural inconsistencies or runtime errors.

The validation pipeline also incorporates a learning component that analyzes patterns in validation failures and successful refinements. This data is used to continuously improve the system's ability to guide the AI assistant towards generating compliant outputs on the first attempt, potentially reducing the need for extensive refinement cycles over time.

This comprehensive validation and refinement system represents a significant advancement in ensuring data integrity and format consistency within the conversational agent creation platform, enabling the development of more robust and reliable conversational agents.

The AI prompt editing and optimization feature within the conversational agent creation system employs advanced natural language processing and machine learning techniques to analyze, improve, and update prompts used by the agent. This feature enhances the effectiveness of agent interactions by refining the language, tone, and structure of prompts based on contextual analysis and performance metrics.

The system implements a multi-stage process for prompt analysis and optimization. Initially, when a user activates the "Edit AI Prompt" function for a specific step, the current prompt text is extracted and passed through a series of preprocessing steps. These steps include tokenization, part-of-speech tagging, and dependency parsing to break down the prompt into its constituent linguistic components.

Following preprocessing, the system performs a comprehensive analysis of the prompt using a combination of rule-based heuristics and deep learning models. The rule-based component evaluates the prompt against a set of predefined criteria, including clarity, conciseness, and adherence to best practices in conversational design. This analysis identifies potential areas for improvement, such as overly complex sentence structures, ambiguous phrasing, or lack of specificity.

Concurrently, the deep learning component of the analysis utilizes transformer-based language models trained on vast corpora of successful conversational interactions. These models assess the prompt's semantic content, emotional tone, and potential effectiveness in eliciting desired user responses. The system generates embeddings for the prompt and compares them against embeddings of high-performing prompts from similar contexts, identifying opportunities for enhancement.

Based on the combined output of the rule-based and deep learning analyses, the system generates a set of suggested optimizations for the prompt. These optimizations range from minor adjustments in wording to more substantial restructuring of the prompt's content. The system ranks these suggestions based on their predicted impact on agent performance, taking into account factors such as the specific goals of the conversation step and the overall context of the agent's purpose.

The system presents the top-ranked optimization suggestions to the user through the conversational interface. Each suggestion includes a rationale for the proposed change, highlighting the specific aspects of the prompt that would be improved. For example, the system might suggest rephrasing a question to be more open-ended, providing a clear explanation of how this change could lead to more informative user responses.

When a user approves a suggested optimization, the system applies the change directly to the prompt within the agent's structure. This process involves updating the relevant data structures and triggering the necessary function calls to modify the step's content. The system ensures that these updates are reflected immediately in the visual representation of the agent flow, maintaining consistency across all components of the platform.

The AI prompt editing feature incorporates continuous learning capabilities to refine its optimization strategies over time. The system tracks the performance of optimized prompts, collecting data on user engagement, response rates, and conversation outcomes. This data feeds back into the training process for the deep learning models, allowing the system to adapt its suggestions based on real-world effectiveness.

To illustrate the functionality of the AI prompt editing feature, consider a scenario where an agent includes a step asking users about their product preferences. The original prompt might read: "What kind of product are you looking for?" Upon analysis, the system identifies that this prompt lacks specificity and might not effectively guide users towards providing actionable information.

The system generates several optimization suggestions, including:
1. "Could you describe the specific features or characteristics you're seeking in a product?"
2. "Are you interested in any particular category of products, such as electronics, clothing, or home goods?"
3. "What problem are you hoping to solve with this product?"

Each suggestion aims to elicit more detailed and relevant responses from users, potentially improving the agent's ability to provide targeted recommendations or assistance.

When the user selects one of these optimized prompts, the system updates the step's content accordingly. This update triggers a series of backend processes, including modifying the agent's internal representation, updating the visual flow in the sequence builder, and adjusting any related conditional logic or branching paths that depend on user responses to this prompt.

The AI prompt editing and optimization feature extends beyond individual prompt improvements to offer holistic suggestions for enhancing the overall conversation flow. By analyzing the relationships between prompts across multiple steps, the system identifies opportunities for more cohesive and effective interactions. This includes suggestions for introducing transitional phrases between steps, ensuring consistent tone throughout the conversation, and optimizing the sequence of questions to maximize information gathering while maintaining user engagement.

Furthermore, the system supports context-aware prompt optimization by considering variables such as user demographics, interaction history, and specific use cases. This allows for dynamic adjustment of prompts based on real-time factors, enhancing the personalization and effectiveness of agent interactions.

The AI prompt editing and optimization feature represents a significant advancement in conversational AI development, enabling rapid iteration and refinement of agent behaviors. By combining linguistic analysis, machine learning, and user-friendly interfaces, the system empowers developers to create more sophisticated and effective conversational agents with minimal manual effort.

The file input and interpretation system within the conversational agent creation platform incorporates advanced parsing and analysis capabilities to process uploaded text and image files, integrating their content into the sequence building process. This system enhances the agent creation workflow by allowing users to leverage existing scripts, conversation flows, or visual representations as starting points for developing sophisticated conversational agents.

For text file uploads, the system employs a multi-stage parsing process. Initially, the uploaded file undergoes format detection to identify its structure, such as plain text, CSV, or JSON. Based on the detected format, the system applies appropriate parsing algorithms to extract relevant information. In the case of structured formats like CSV or JSON, the parser identifies key-value pairs or tabular data that correspond to conversation steps, conditions, or agent parameters.

The extracted text content undergoes natural language processing (NLP) to identify semantic structures relevant to conversation flows. This process includes tokenization, part-of-speech tagging, and named entity recognition to identify potential conversation steps, user intents, and entity types. The system utilizes machine learning models trained on large corpora of conversational data to recognize patterns indicative of effective dialogue structures.

For script-like text files, the system employs specialized parsing algorithms designed to identify dialogue elements such as speaker turns, questions, responses, and conditional branches. These algorithms leverage contextual cues and formatting patterns commonly used in conversation scripts to segment the text into discrete steps that can be mapped to the agent's sequence structure.

The parsed text content is then transformed into a structured representation compatible with the sequence builder's internal data model. This transformation process maps identified conversation elements to corresponding node types within the sequence builder, such as steps, conditions, or prompts. The system generates preliminary metadata for each node, including suggested labels, descriptions, and potential connections to other nodes based on the logical flow inferred from the text.

As an optional or alternative embodiment, the system can also process image file uploads, such as hand-drawn flow diagrams. When a user uploads an image file, the system first applies image preprocessing techniques to enhance quality and reduce noise. This preprocessing includes operations like contrast adjustment, edge detection, and binarization to isolate key visual elements.

In this optional embodiment, the preprocessed image undergoes computer vision analysis to identify structural components commonly found in flow diagrams, such as boxes, arrows, and text regions. The system employs image recognition techniques trained on diverse datasets of flow diagrams to recognize these elements with high accuracy, even in hand-drawn or non-standard formats.

Optical character recognition (OCR) techniques may be applied to extract text content from identified text regions within the image. The extracted text undergoes similar NLP processing as uploaded text files to identify conversation elements and their relationships.

The system then constructs a graph representation of the flow diagram based on the identified visual elements and their spatial relationships. This graph structure captures the logical flow of the conversation, including branching paths and decision points. The graph is then mapped to the sequence builder's internal representation, with nodes corresponding to conversation steps and edges representing transitions between steps.

For both text and image inputs, the system incorporates the parsed and interpreted content into the sequence building process by generating a preliminary sequence structure. This structure serves as a starting point for users to refine and expand upon using the platform's other tools, such as the conversational interface or direct manipulation within the sequence builder.

The file input and interpretation system includes robust error handling and validation mechanisms to manage unsupported file formats or content that cannot be reliably interpreted. When an unsupported file format is detected, the system generates an error message detailing the issue and providing guidance on supported formats. For partially interpretable content, the system flags ambiguous or unrecognized elements, allowing users to manually review and adjust the imported structure as needed.

The system maintains a clear separation between imported content and user-generated modifications to ensure data integrity and traceability. Imported elements are tagged with metadata indicating their source, allowing users to easily identify and manage content derived from external files throughout the agent development process.

By integrating advanced file parsing and interpretation capabilities, the conversational agent creation platform enables users to leverage existing resources and visual representations as foundations for building sophisticated conversational agents. This approach streamlines the initial stages of agent development, allowing users to focus on refining and optimizing conversation flows rather than starting from scratch for each new agent.

The conversational agent creation system incorporates a comprehensive revision control and history management feature to enable tracking, comparison, and restoration of previous states of conversation flows. This feature utilizes a sophisticated versioning mechanism that captures and manages the evolution of agent structures over time.

The system implements a snapshot-based approach to version control. Each time a significant modification is made to the agent's structure, such as adding or deleting steps, changing conditions, or updating prompts, the system automatically generates a snapshot of the entire agent configuration. These snapshots encapsulate the complete state of the agent, including all nodes, connections, prompts, and associated metadata. Every canvas mutation produces a snapshot identifier, allowing users to revert or create branches instantly.

Full JSON snapshots (typically under 100 kB each) are stored in a relational database. Differencing is performed in the application layer rather than by binary patching. This approach allows for efficient storage and retrieval of historical versions while maintaining the ability to compare and analyze changes between different states of the agent.

The snapshot creation process involves serializing the agent's internal data structures into a JSON format. This serialized representation includes a hierarchical structure that mirrors the agent's conversation flow, with each node containing its properties, connections, and associated logic. The system applies compression algorithms to further reduce the size of the serialized data, enhancing storage efficiency and retrieval speed.

Each snapshot is assigned a unique identifier, typically a combination of a timestamp and a hash of the snapshot contents. This identifier serves as a reference point for accessing specific versions of the agent structure. The system maintains an index of these identifiers, along with metadata such as the user who made the changes, a brief description of the modifications, and any associated tags or labels.

The version control system employs a distributed storage architecture to ensure reliability and fast access to historical data. Snapshots are replicated across multiple storage nodes, with consistency maintained through a distributed consensus algorithm. This approach provides redundancy and allows for efficient retrieval of historical versions, even for large and complex agent structures.

When a user requests to view or restore a previous version of the agent, the system initiates a reconstruction process. This process involves retrieving the relevant snapshot and applying the recorded changes in reverse order until the desired historical state is reached. The reconstructed agent structure is then loaded into memory and presented to the user through the sequence builder interface.

The system provides functionality for comparing different versions of the agent structure. When a user selects two snapshots for comparison, the system performs a differential analysis to identify added, removed, or modified elements between the versions. This comparison is visualized through a side-by-side view in the user interface, highlighting changes in node structure, connections, and prompt content.

To support efficient navigation through the version history, the system implements a branching model. This model allows users to create divergent paths in the agent's development, similar to branching in software version control systems. Users can experiment with alternative conversation flows or structural changes without affecting the main development line. The system manages these branches, allowing users to merge changes or switch between different development paths as needed.

The revision control feature integrates with the system's undo/redo functionality, providing a seamless experience for navigating through recent changes. The undo/redo stack is synchronized with the snapshot history, allowing users to move back and forth through modifications with granular control.

To ensure data integrity and prevent unauthorized modifications to the version history, the system implements cryptographic signing of snapshots. Each snapshot is digitally signed using the user's credentials, creating an auditable trail of changes. This signing process verifies the authenticity of historical versions and protects against tampering or unauthorized alterations to the agent's development history.

The revision control and history management feature includes a purging mechanism to manage storage constraints and comply with data retention policies. This mechanism allows administrators to define retention rules, automatically archiving or deleting snapshots that exceed specified age or relevance thresholds. The purging process maintains referential integrity, ensuring that dependent snapshots or branches are not inadvertently affected by the removal of historical data.

By implementing this comprehensive revision control and history management system, the conversational agent creation platform provides users with powerful tools for tracking, comparing, and restoring agent configurations throughout the development process. This feature enhances collaboration, enables experimentation, and provides a safety net for recovering from unintended changes, ultimately supporting the creation of more robust and refined conversational agents.

The conversational agent creation system incorporates a sophisticated test mode and conversation review feature that enables users to simulate, analyze, and optimize agent interactions. This feature utilizes advanced natural language processing and machine learning techniques to evaluate conversation flows, identify areas for improvement, and suggest targeted enhancements.

The test mode simulates real-world interactions by generating user inputs based on predefined scenarios and randomized variations. These simulated inputs are processed through the agent's conversation flow, triggering responses and decision points as defined in the sequence structure. The system records each step of the simulated conversation, including user inputs, agent responses, and the specific nodes traversed within the flow.

During the simulation, the system employs a multi-layered analysis approach to evaluate the effectiveness of the conversation. This analysis includes metrics such as response relevance, conversation coherence, and goal achievement. Natural language understanding models assess the semantic alignment between user inputs and agent responses, while dialogue management algorithms evaluate the logical progression of the conversation.

The system utilizes a combination of rule-based heuristics and machine learning models to identify weak points in the conversation flow. Rule-based analysis checks for common issues such as repetitive responses, dead-end paths, or excessive branching. Graph-traversal heuristics and rule-based validators check path integrity, identify unused nodes, and analyze loop depth to ensure the conversation flow is structurally sound and logically coherent.

When weak points are identified, the system generates improvement suggestions using a context-aware recommendation engine. This engine considers factors such as the specific goals of the agent, the nature of the identified issue, and historical performance data from similar conversation patterns. Suggestions range from minor adjustments in prompt wording to more substantial restructuring of conversation paths.

The system presents improvement suggestions to users through an interactive interface within the sequence builder. Each suggestion includes a detailed explanation of the identified issue, the proposed change, and the expected impact on conversation performance. Users can review these suggestions, modify them if necessary, and apply them directly to the agent's structure.

When a user chooses to apply a suggestion, the system initiates a series of automated updates to the agent's configuration. These updates involve modifying node properties, adjusting connection logic, or inserting new steps into the conversation flow. The system ensures that these changes are applied consistently across all relevant parts of the agent structure, maintaining overall coherence and functionality.

The conversation review feature allows users to analyze completed test conversations in detail. Users can replay simulated interactions step by step, examining the flow of the conversation and the specific decisions made by the agent at each point. This replay functionality includes visualizations of the traversed path within the sequence structure, helping users understand how different branches and conditions are activated during the interaction.

The system also supports transcript-driven self-healing capabilities. After a test run, the user can supply the conversation transcript to the system for analysis. The system examines the transcript to identify weak points such as fallback-intent frequency or unhandled paths. Based on this analysis, the system can automatically patch the flow, adding missing logic, refining prompts, or adjusting decision paths to address the identified issues. This automated improvement process significantly reduces the manual effort required to optimize agent performance and ensures that the agent can effectively handle a wide range of user interactions.

The test mode and conversation review feature supports batch testing capabilities, allowing users to run multiple simulated conversations simultaneously. This batch processing enables comprehensive evaluation of the agent's performance across a wide range of scenarios and user inputs. The system aggregates results from these batch tests, providing statistical insights into the agent's overall effectiveness and highlighting recurring patterns or issues.

Advanced users can customize the test mode by defining specific test scenarios or user profiles. These customizations allow for targeted evaluation of particular conversation paths or user demographics, ensuring that the agent performs optimally across diverse use cases.

The system integrates the test mode and conversation review feature with the broader agent development workflow. Users can seamlessly transition between testing, reviewing results, and making modifications to the agent structure. This integration supports an iterative development process, where insights gained from testing directly inform refinements to the conversation flow.

By providing comprehensive testing, analysis, and optimization capabilities, the test mode and conversation review feature enables users to create more robust and effective conversational agents. This data-driven approach to agent refinement helps identify and address potential issues before deployment, ultimately leading to improved user experiences and more successful conversational interactions.

The conversational agent creation system incorporates a multi-module architecture designed to handle specific technical features while facilitating seamless interaction and communication between components. This architecture enhances the system's flexibility, scalability, and maintainability by encapsulating distinct functionalities within specialized modules.

The core of the system comprises several interconnected modules, each responsible for a specific aspect of the conversational agent creation process. These modules include the Conversational Interface Module, Sequence Builder Module, Function Execution Module, Canvas Rendering Module, File Input and Interpretation Module, Revision Control Module, and Test and Optimization Module.

The Conversational Interface Module serves as the primary point of interaction for users, processing natural language inputs and generating appropriate responses. This module employs advanced natural language processing techniques to interpret user intentions, translate them into actionable instructions, and provide contextually relevant feedback. The module maintains an ongoing dialogue state, allowing for coherent and context-aware interactions throughout the agent creation process.

The Sequence Builder Module manages the structural representation of the conversational agent's conversation flow. This module interprets user inputs and system-generated instructions to construct and modify the logical structure of the agent. It maintains a graph-based representation of conversation nodes, including steps, decision points, and branching paths. The Sequence Builder Module implements algorithms for node placement, connection management, and flow validation to ensure the integrity and coherence of the agent structure.

The Function Execution Module handles the translation of high-level instructions into concrete modifications of the agent's structure and behavior. This module implements a robust function calling architecture with a predefined set of operations that can be performed on the agent's conversation flow. The Function Execution Module manages an asynchronous job queue, validating and executing operations while maintaining data consistency and handling potential conflicts in concurrent modifications. Each function call is processed through a series of validation checks before being executed, ensuring that all parameters conform to expected formats and value ranges. The module supports bidirectional communication capabilities, enabling both read operations to retrieve the current state of the agent and write operations to modify its structure. This comprehensive approach to function execution provides a reliable foundation for translating user intentions into concrete agent behaviors.

The system incorporates knowledge base integration capabilities that enable the conversational assistant to interact with external knowledge repositories through dedicated functions. These functions include kb_read for retrieving knowledge base content, kb_search for locating specific information using text or pattern-based queries, and kb_update for modifying knowledge base entries within the context of the active conversation flow. This integration allows the assistant to identify gaps in the knowledge base during agent development and suggest improvements or additions that enhance the agent's ability to provide accurate and comprehensive responses.

The Canvas Rendering Module is responsible for the visual representation of the agent's conversation flow. This module employs advanced layout algorithms to optimize the placement and arrangement of conversation nodes within the visual workspace. It handles real-time updates to the canvas, ensuring that changes made through other modules are immediately reflected in the visual representation. The Canvas Rendering Module also implements zooming, panning, and selective rendering techniques to maintain performance when working with complex agent structures.

The File Input and Interpretation Module processes uploaded text and image files, integrating their content into the sequence building process. For text files, this module employs parsing algorithms and natural language processing techniques executed on backend services to extract relevant conversation elements. For image files, such as hand-drawn flow diagrams, the module utilizes computer vision techniques hosted on server infrastructure to interpret visual representations of conversation flows. The extracted information is then transformed into a structured representation compatible with the Sequence Builder Module.

The Revision Control Module implements a comprehensive versioning system to track, compare, and restore previous states of conversation flows. This module utilizes a snapshot-based approach, capturing the entire agent configuration at significant modification points. The Revision Control Module manages the storage, retrieval, and comparison of these snapshots, enabling users to navigate through the agent's development history and revert to previous versions when necessary.

The Test and Optimization Module facilitates the simulation, analysis, and refinement of agent interactions. This module generates simulated user inputs, processes them through the agent's conversation flow, and evaluates the effectiveness of the interactions. It employs a combination of rule-based heuristics and analysis algorithms to identify weak points in the conversation flow and generate improvement suggestions. The Test and Optimization Module also provides tools for detailed conversation review and analysis.

These modules interact through a well-defined set of interfaces and communication protocols. The system employs a message-passing architecture, allowing modules to exchange information and trigger actions in other components without tight coupling. This approach enhances the system's modularity and facilitates the addition or modification of features without disrupting the overall architecture.

A central orchestration layer manages the coordination between modules, ensuring that actions initiated in one module are properly propagated to other relevant components. For example, when a user makes a change through the Conversational Interface Module, the orchestration layer coordinates the necessary updates in the Sequence Builder Module, triggers appropriate function calls in the Function Execution Module, and ensures that the Canvas Rendering Module reflects the changes visually.

The system implements a publish-subscribe pattern for event-driven communication between modules. Modules can subscribe to specific events or state changes, allowing them to react and update their internal state accordingly. This pattern enhances the system's responsiveness and maintains consistency across different components.

Data exchange between modules occurs through standardized data structures and serialization formats. The system employs efficient binary serialization for large data transfers, such as snapshot data in the Revision Control Module, while using lightweight JSON-based formats for smaller, more frequent communications between modules.

The multi-module architecture incorporates robust error handling and fault tolerance mechanisms. Each module implements internal error detection and recovery procedures, while the central orchestration layer provides system-wide error management. This approach ensures that localized issues within a single module do not compromise the overall stability of the system.

The system implements an efficient node storage mechanism where each node of the graph is stored in memory as a fixed-length record. This record contains a node identifier, a node-type code, and two 16-bit integer grid coordinates. The fixed-length format allows for rapid access and manipulation of node data. Each directed edge in the graph is stored as a pair of node identifiers, enabling efficient traversal and modification of the graph structure.

To optimize rendering performance, the system employs a viewport-based rendering approach. The canvas rendering engine is designed to render only nodes whose coordinates lie within the current viewport rectangle. This technique significantly reduces the computational load for large and complex conversation flows, ensuring smooth user interaction even with extensive agent structures.

The system incorporates a sophisticated validation and refinement process for machine-generated data. When data fails initial validation, an iterative refinement loop is initiated. This loop identifies specific deviations from the expected schema, formulates follow-up queries for the language model, obtains revised outputs, and repeats the parsing process until the data conforms to the required schema. To maintain system responsiveness, this refinement loop executes in a non-blocking asynchronous manner.

For efficient handling of modifications to the conversation sequence, the system employs a lock-free circular buffer resident in shared memory. This buffer provides positional indices through a single atomic fetch-and-add instruction, enabling high-performance concurrent access without the need for explicit locking mechanisms. Modifications to the conversation sequence are queued as jobs in this buffer, ensuring orderly processing of user inputs and system-generated changes.

When executing queued jobs to mutate the graph, the system utilizes an integer-only force-directed solver to compute candidate grid-aligned coordinates for new nodes. This solver enforces a non-overlap constraint and maintains Start-and-End anchor positions, ensuring that the visual representation of the conversation flow remains clear and logically structured. The system writes the computed coordinates into the fixed-length node record only when a collision-free position is located, maintaining the integrity of the graph layout.

To optimize rendering performance during graph mutations, the system implements a selective re-rendering approach. After a mutation is applied to the graph, the system re-renders only the region of the viewport affected by the change. This targeted updating minimizes unnecessary redraws and enhances the responsiveness of the user interface, particularly when working with large and complex conversation flows.

The system maintains a comprehensive version history of the conversation sequence through compressed JSON snapshots. After each mutation to the graph, the system creates a compressed JSON representation of the entire conversation sequence. This snapshot is stored in persistent storage along with a unique identifier, enabling efficient storage, retrieval, and comparison of different versions of the conversation flow. The unique identifier may be formed by hashing the compressed JSON snapshot and concatenating the hash with a timestamp, ensuring a reliable and chronological version history.

The modular design of the conversational agent creation system allows for independent scaling and optimization of individual components. Modules with higher computational requirements, such as the Test and Optimization Module or the File Input and Interpretation Module, can be allocated additional resources or distributed across multiple processing nodes without affecting the performance of other components.

This multi-module architecture provides a flexible and extensible foundation for the conversational agent creation system. By encapsulating specific functionalities within dedicated modules and establishing clear communication protocols, the system can adapt to evolving requirements, incorporate new features, and maintain high performance even as the complexity of conversational agents continues to grow.

The conversational agent creation system incorporates advanced artificial intelligence and machine learning techniques across various components to enhance functionality and improve user experience. Natural language processing models form a core part of the conversational interface, employing transformer-based architectures executed on backend services for understanding user inputs and generating contextually appropriate responses. These models are fine-tuned on domain-specific conversational data to improve their performance in the context of conversational agent creation.

The system utilizes analysis algorithms and rule-based heuristics for conversation flow evaluation and optimization. Graph-traversal algorithms analyze the structure of conversation flows, identifying patterns and potential inefficiencies by examining node connectivity, path completeness, and logical consistency. These algorithms process the sequential nature of conversations, evaluating the coherence and effectiveness of dialogue paths through systematic analysis of conversation step relationships and user interaction patterns.

For prompt optimization, the system implements a combination of natural language generation models hosted on backend services and rule-based evaluation algorithms. Transformer-based models are used to generate alternative phrasings and structures for prompts. These generated alternatives are then evaluated using algorithms that consider factors such as clarity, engagement potential, and alignment with conversation goals. The optimization process iteratively refines the prompt generation based on the outcomes of simulated conversations and user feedback.

The file input and interpretation module employs computer vision techniques executed on backend services for processing uploaded image files. Machine learning models hosted on server infrastructure and trained on diverse datasets of flow diagrams and hand-drawn sketches are used to recognize structural elements such as boxes, arrows, and text regions. These models are complemented by optical character recognition (OCR) capabilities that extract text content from identified regions, enabling the system to interpret and convert visual representations into structured conversation flows.

The test and optimization module incorporates analysis techniques to evaluate and improve agent performance. Multiple analysis algorithms examine different aspects of simulated conversations, including response relevance, conversation coherence, and goal achievement. These algorithms assess factors such as response appropriateness, conversation flow efficiency, and user satisfaction indicators. The combined outputs of these analyses provide comprehensive insights and generate targeted improvement suggestions.

The system implements adaptive learning algorithms to continuously refine its performance based on user interactions and feedback. Techniques such as reinforcement learning principles are used to balance exploration and exploitation in recommendation systems, ensuring that the system adapts to evolving user preferences and conversation patterns while maintaining effectiveness in its suggestions.

Natural language understanding models within the system utilize attention mechanisms and contextual embeddings executed on backend services to capture nuanced relationships between words and phrases in user inputs and agent responses. These models are trained using techniques such as transfer learning and multi-task learning to leverage knowledge from related domains and improve performance across diverse conversation scenarios.

The revision control module employs clustering algorithms to organize and categorize different versions of agent configurations. Techniques such as hierarchical clustering are used to group similar versions, facilitating efficient navigation and comparison of historical states. These clustering approaches are complemented by dimensionality reduction techniques to visualize the relationships between different versions in a comprehensible format.

The system incorporates anomaly detection algorithms to identify unusual patterns or behaviors in agent interactions. Statistical analysis techniques and pattern recognition algorithms are used to detect outliers in conversation flows, alerting users to potential issues or unexpected agent responses that require attention.

For handling complex decision-making processes within agent flows, the system implements probabilistic reasoning models. These models capture dependencies between different conversation elements and enable reasoning under uncertainty, allowing the agent to make more informed decisions based on partial or ambiguous user inputs.

The AI and machine learning implementations within the system are designed to work in concert, enhancing the overall capabilities of the conversational agent creation platform. By leveraging these advanced techniques executed on backend services, the system provides users with powerful tools for creating, optimizing, and managing sophisticated conversational agents, ultimately leading to more effective and engaging user interactions.

The conversational agent creation system employs a diverse array of artificial intelligence and machine learning models hosted on backend services to support various functionalities across its components. These models are specifically designed and optimized for tasks related to natural language processing, conversation flow analysis, and agent optimization.

For natural language understanding and generation tasks, the system utilizes transformer-based architectures hosted on server infrastructure. The primary model is based on architectures such as BERT (Bidirectional Encoder Representations from Transformers), which consists of multiple layers of self-attention mechanisms and feed-forward neural networks. This model is pre-trained on a large corpus of text data and then fine-tuned on domain-specific conversational data relevant to conversational agent interactions. The fine-tuning process involves adjusting the model's parameters using a dataset of successful agent-user conversations, enabling it to better understand and generate responses in the context of conversational agent interactions.

The transformer-based model is complemented by generative language models such as GPT (Generative Pre-trained Transformer) architectures for advanced text generation tasks, particularly in prompt optimization. These models use similar transformer-based structures but are trained to predict the next token in a sequence, making them well-suited for generating coherent and contextually appropriate text. These models undergo continuous fine-tuning based on user feedback and interaction data to improve their performance in generating effective prompts and responses.

For analyzing and optimizing conversation flows, the system employs graph-traversal algorithms and rule-based analysis systems. The analysis algorithms examine the structural representation of conversation flows, where each element represents a node or connection in the flow graph. The algorithms apply systematic analysis techniques to detect patterns and identify areas for improvement, while rule-based systems evaluate conversation logic and flow integrity.

Sequential analysis algorithms process the temporal nature of conversations, taking as input the sequence of conversation steps and evaluating the coherence and effectiveness of dialogue paths. These algorithms analyze conversation flow patterns and generate scores for various metrics such as engagement, clarity, and goal achievement.

The system's file input and interpretation module utilizes specialized computer vision models hosted on backend services for processing uploaded image files. These models are trained on diverse datasets of flow diagrams and hand-drawn sketches, enabling them to recognize structural elements such as boxes, arrows, and text regions. The computer vision architecture includes additional layers for object detection and segmentation, allowing it to identify and localize specific elements within the input images.

For optical character recognition (OCR) tasks, the system employs hybrid architectures that combine computer vision and sequence processing capabilities. The computer vision layers extract visual features from the image, while sequence processing algorithms analyze the extracted features to recognize text. These models are trained on large datasets of handwritten and printed text samples to ensure robust performance across various writing styles and fonts.

The test and optimization module incorporates multiple analysis algorithms to evaluate and improve agent performance. These algorithms analyze different aspects of simulated conversations, such as response relevance, conversation coherence, and goal achievement. The outputs of these algorithms are combined using weighted evaluation mechanisms, where the weights are dynamically adjusted based on the performance of individual algorithms over time.

To continuously refine its performance based on user interactions and feedback, the system implements adaptive learning algorithms. A key component of this is a recommendation algorithm that maintains effectiveness distributions over different conversation strategies and prompts. As users interact with the system and provide feedback, the algorithm updates these distributions, allowing it to balance exploration of new strategies with exploitation of known effective approaches.

The revision control module utilizes unsupervised learning techniques for organizing and categorizing different versions of agent configurations. A hierarchical clustering algorithm is employed to group similar versions based on their structural and content similarities. This algorithm starts with each version as a separate cluster and iteratively merges the most similar clusters until a predefined number of clusters or similarity threshold is reached. The resulting cluster hierarchy is then used to facilitate efficient navigation and comparison of historical states.

For anomaly detection in agent interactions, the system employs statistical analysis algorithms. These algorithms analyze patterns in typical agent interactions, allowing them to identify unusual behaviors or patterns that deviate significantly from the norm.

The training process for these models involves several stages. Initially, models are pre-trained on large, general-purpose datasets relevant to their specific tasks. For example, transformer-based models are pre-trained on vast corpora of text data, while computer vision models for image processing are pre-trained on large image datasets.

Following pre-training, the models undergo domain-specific fine-tuning using datasets curated for conversational agent interactions. This fine-tuning process involves adjusting the model parameters using techniques such as transfer learning and multi-task learning. Transfer learning allows the models to leverage knowledge gained from pre-training while adapting to the specific nuances of conversational agent conversations. Multi-task learning enables the models to simultaneously optimize for multiple related tasks, improving their overall performance and generalization capabilities.

The fine-tuning datasets are carefully curated to include a diverse range of conversation scenarios, user intents, and agent responses. These datasets are continuously expanded and updated based on real-world interactions and feedback from users of the conversational agent creation system. Data preprocessing techniques, such as tokenization, normalization, and augmentation, are applied to ensure the quality and consistency of the training data.

To maintain and improve model performance over time, the system implements a continuous learning pipeline. This pipeline monitors the performance of deployed models, collects new interaction data, and periodically retrains or fine-tunes the models. The retraining process incorporates both the original training data and newly collected data, ensuring that the models remain up-to-date with evolving conversation patterns and user expectations.

The AI model architecture and training methodologies employed in the conversational agent creation system are specifically tailored to the tasks of natural language understanding, conversation flow analysis, and agent optimization. By combining advanced neural network structures with sophisticated training techniques and continuous learning mechanisms, the system provides a robust and adaptable foundation for creating and refining conversational agents.

The conversational agent creation system introduces several technical advancements that address existing challenges in the field of conversational AI development. These advancements significantly improve the efficiency, accuracy, and usability of the agent creation process.

One key technical advancement is the integration of a conversational interface directly within the sequence builder environment. This integration allows users to interact with the system using natural language commands, eliminating the need for complex manual configuration or programming skills. The system's natural language processing capabilities executed on backend services interpret user intentions and translate them into actionable modifications of the agent's structure. This advancement overcomes the challenge of technical barriers that often hinder non-expert users from creating sophisticated conversational agents.

The system's function execution architecture represents another significant technical advancement. By implementing a structured set of predefined functions for manipulating the agent's conversation flow, including bidirectional communication capabilities that enable both read and write operations, the system ensures consistent and reliable modifications to the agent structure. The asynchronous job queue mechanism for executing these functions enhances system responsiveness and maintains data integrity, even when handling complex operations or concurrent modifications. This architecture addresses the challenge of maintaining consistency and preventing conflicts in multi-user development environments.

The implementation of real-time visual feedback and automatic node placement within the sequence builder constitutes a notable technical improvement. The system's canvas rendering engine employs advanced layout algorithms with automated geometry governance to optimize the placement and arrangement of conversation nodes. This feature overcomes the challenge of managing complex conversation flows by providing users with clear, readable visual representations of agent structures. The automatic validation and repositioning of nodes, combined with non-overlap enforcement and mandatory anchor point management, ensure that the visual representation remains coherent and usable, even as the complexity of the agent increases.

The system's file input and interpretation capabilities represent a significant advancement in streamlining the agent creation process. By incorporating computer vision and natural language processing techniques executed on backend services, the system can interpret and integrate content from uploaded text and image files. This feature addresses the challenge of leveraging existing resources and visual representations in agent development, allowing users to quickly bootstrap new agents based on established conversation patterns or hand-drawn flow diagrams.

The implementation of a comprehensive revision control and history management system with branching capabilities marks an important technical advancement. By capturing and managing the evolution of agent structures over time with unique snapshot identifiers, the system enables users to track changes, compare different versions, create development branches, and revert to previous states instantly. This feature addresses the challenge of maintaining traceability and supporting iterative development processes in complex conversational agent projects.

The system's test and optimization module introduces advanced simulation and analysis capabilities, including transcript-driven self-healing functionality, that significantly enhance the agent refinement process. By employing analysis algorithms to evaluate conversation effectiveness and generate improvement suggestions, and by automatically analyzing test transcripts to identify weak points and apply corrective patches, the system addresses the challenge of identifying and resolving issues in agent behavior. This data-driven approach to optimization enables users to create more robust and effective conversational agents with reduced manual effort.

The integration of AI prompt editing and optimization features within the sequence builder environment represents a notable technical advancement. By providing context-aware suggestions for improving prompt wording and structure, the system addresses the challenge of crafting effective conversational prompts. This feature enhances the quality and consistency of agent interactions without requiring extensive expertise in conversational design.

The system's multi-module architecture and inter-module communication protocols constitute a significant technical improvement in terms of system flexibility and extensibility. By encapsulating specific functionalities within dedicated modules and establishing clear communication interfaces, the system addresses the challenge of adapting to evolving requirements and incorporating new features without disrupting existing functionality.

The implementation of advanced artificial intelligence and machine learning techniques executed on backend services across various system components marks a substantial technical advancement. By leveraging state-of-the-art models for natural language processing, conversation flow analysis, and agent optimization, the system addresses the challenge of creating highly sophisticated and effective conversational agents. The continuous learning and adaptation capabilities of these models ensure that the system remains effective and relevant as conversation patterns and user expectations evolve.

These technical advancements collectively transform the process of conversational agent development, making it more accessible, efficient, and effective. By addressing key challenges in the field, the system enables users to create more sophisticated and engaging conversational agents while reducing the time and expertise required for development.

The conversational agent creation system provides a comprehensive and intuitive interface for users to develop, test, and refine sophisticated conversational agents. To illustrate the full capabilities of the system, consider the following detailed example of a user interaction:

A user logs into the conversational agent creation platform with the goal of developing a customer service agent for a telecommunications company. Upon accessing the sequence builder interface, the user is greeted by the conversational assistant, which prompts them to describe their intended agent functionality.

The user types: "Create a customer service agent for handling billing inquiries and technical support for a telecom company."

The conversational assistant processes this input and begins generating an initial conversation flow. The system creates a series of nodes representing key steps in the customer service interaction, including a greeting, issue identification, and branching paths for billing and technical support queries. As each node is created, the canvas rendering engine positions them optimally within the visual workspace using automated layout algorithms, ensuring clear visibility and logical flow while enforcing non-overlap rules and maintaining mandatory Start and End anchor points.

The user reviews the generated flow and decides to refine the greeting. They type: "Make the greeting more personalized and friendly."

The assistant analyzes this request and updates the greeting node, modifying the prompt to include a more welcoming tone and a request for the customer's name. The updated node is immediately reflected in the visual representation, with the changes highlighted for the user's attention. The system automatically generates a snapshot identifier for this modification, enabling future reversion or branching if needed.

Next, the user focuses on the billing inquiry branch of the conversation. They upload a text file containing common billing questions and responses. The file input and interpretation module processes this document using backend natural language processing services, extracting relevant information and suggesting additional nodes to incorporate into the flow. The user reviews these suggestions and approves their integration, expanding the billing inquiry section of the agent.

For the technical support branch, the user uploads an image file of a hand-drawn flowchart depicting a troubleshooting process. The system's computer vision algorithms hosted on backend services analyze this image, identifying key decision points and steps. The assistant then translates this visual representation into a structured sequence of nodes within the agent flow, maintaining the logic of the original diagram while optimizing it for conversational interaction.

As the user continues to refine the agent structure, they encounter a complex scenario involving account verification. They type: "Add a secure account verification process before discussing billing details."

The assistant generates a new subflow for account verification, incorporating multiple steps for identity confirmation. This subflow includes conditional branching based on the success or failure of the verification process. The function execution system manages the creation and integration of these new nodes using bidirectional communication to read the current flow state and write the new components, ensuring proper connections and logical consistency within the overall flow. The user decides to group these related verification steps into a collapsible sub-flow to maintain visual clarity on the main canvas.

To test the developing agent, the user activates the test mode. The system generates simulated user inputs based on common customer inquiries, processing them through the agent's conversation flow. As the simulated conversation progresses, the test and optimization module analyzes each interaction, evaluating factors such as response relevance, conversation coherence, and goal achievement.

Upon completion of the test run, the user copies the conversation transcript and provides it to the assistant for analysis. The transcript-driven self-healing functionality automatically analyzes the conversation, identifying several weak points including high fallback intent frequency in the technical support section and an unhandled path when customers request service cancellation. The system generates improvement suggestions and automatically creates patches for the conversation flow, including new steps to handle cancellation requests and modified prompts to reduce technical support confusion.

During the optimization process, the assistant identifies a gap in the agent's knowledge base regarding a new billing feature. It utilizes the knowledge base integration functions to read the current knowledge base content, search for related information, and propose an update to include details about the new family plan billing structure. The user reviews and approves the proposed addition, and the assistant updates the knowledge base using the kb_update function.

To further refine the agent's responses, the user activates the AI prompt editing feature for a specific node handling technical troubleshooting. The assistant analyzes the current prompt using backend language models and suggests an improved version that breaks down the troubleshooting steps more clearly and includes probing questions to gather more specific information from the customer. The user accepts this suggestion, and the system updates the node with the optimized prompt.

As development progresses, the user decides to compare the current version of the agent with an earlier iteration. They access the revision control system, selecting two snapshots for comparison using their unique identifiers. The system performs a differential analysis, highlighting the changes in node structure, connections, and prompt content between the two versions. This comparison helps the user understand the evolution of their agent and make informed decisions about further modifications. The user also creates a development branch from an earlier snapshot to experiment with an alternative approach to the technical support flow.

Throughout the development process, the system maintains a comprehensive log of all changes, user interactions, and system-generated modifications. Each modification generates a unique snapshot identifier, and the revision control system tracks the complete development history with branching capabilities. This detailed history provides a clear audit trail of the agent's development, allowing for easy tracking of improvements and the ability to revert to previous states or create new development branches instantly.

By the end of the session, the user has created a sophisticated conversational agent capable of handling a wide range of customer service scenarios for their telecommunications company. The agent incorporates personalized greetings, secure account verification, detailed billing inquiry handling, and a structured technical support process. Through iterative testing, knowledge base enhancement, transcript-driven optimization, and AI-assisted refinement, the user has created a robust agent without requiring deep technical expertise in conversational AI or programming.

This comprehensive example demonstrates the system's ability to streamline the entire lifecycle of conversational agent development, from initial creation through testing, optimization, and knowledge base integration. By providing an intuitive, conversational interface for agent creation and powerful tools for refinement and analysis, the system enables users to create highly effective conversational agents with efficiency and precision.

A number of implementations have been described. Nevertheless, it will be understood that various modifications may be made without departing from the spirit and scope of the disclosure. Accordingly, other implementations are within the scope of the following claims.

The invention claimed is:

1. A computer-implemented method for graph-based conversational-flow editing, the method comprising:
   receiving, by a processor, an initial natural-language prompt that describes at least one conversational goal;
   generating, by the processor executing a unified flow-generation routine, a graph representation of a conversational sequence, each node of the graph being stored in memory as a record containing at least a node identifier and coordinates, and each directed edge being stored using identifiers that reference connected nodes;
   rendering, on a display in communication with the processor, nodes whose coordinates lie within a current viewport rectangle;
   receiving, via a user interface, a natural-language input specifying a modification to the conversational sequence; and
   apply a modification, based on a natural-language input specifying the modification to the conversational sequence, by:
      automatically determining coordinates for any new or moved node using a layout routine that enforces spatial separation;
      updating the corresponding node record; and
      storing a snapshot of the conversational sequence with an identifier in persistent storage.

2. The method of claim 1, wherein the nodes are stored as fixed-length records and the coordinates are grid coordinates.

3. The method of claim 1, wherein the directed edges are stored as pairs of node identifiers.

4. The method of claim 1, wherein the layout routine comprises a force-directed solver that enforces a non-overlap constraint and Start-and-End anchor positions.

5. The method of claim 1, wherein rendering comprises re-rendering only a region of the viewport affected by the modification.

6. The method of claim 1, wherein the snapshot is a compressed JSON snapshot.

7. The method of claim 6, wherein the identifier is formed by hashing the compressed JSON snapshot and concatenating the hash with a timestamp.

8. The method of claim 1, further comprising grouping a subset of nodes into a collapsible container that is treated as a single node record in the generating, rendering, modifying, and storing steps.

9. The method of claim 1, further comprising queuing the natural-language input as a job in a lock-free circular buffer resident in shared memory.

10. The method of claim 9, further comprising indexing the job with an atomic fetch-and-add instruction.

11. The method of claim 1, wherein graphics hardware exposes viewport clipping leveraged by the rendering and re-rendering.

12. The method of claim 1, wherein each node of the graph record contains integer grid coordinates.

13. The method of claim 1, wherein validating any machine-generated data destined for insertion into the conversational sequence comprises parsing the data with format-specific schema validators that dynamically adapt to JSON, XML, code snippets, or custom structures.

14. The method of claim 13, wherein an iterative refinement loop identifies deviations from the schema.

15. The method of claim 14, wherein the iterative refinement loop formulates follow-up queries for a language model.

16. The method of claim 15, wherein the iterative refinement loop obtains a revised output.

17. The method of claim 16, wherein the iterative refinement loop repeats parsing until the data conforms to the schema and executes in a non-blocking asynchronous manner.

18. A system for graph-based conversational-flow editing, the system comprising:
   a multi-core processor;
   a memory coupled to the processor, the memory storing node records; and
   a non-transitory computer-readable medium storing instructions that, when executed by the processor, cause the system to:
      receive an initial natural-language prompt that describes at least one conversational goal;
      generate, by executing a unified flow-generation routine, a graph representation of a conversational sequence, each node of the graph being stored in the memory as a record containing at least a node identifier and coordinates, and each directed edge being stored using identifiers that reference connected nodes;
      render, on a display in communication with the processor, nodes whose coordinates lie within a current viewport rectangle;
      receive, via a user interface, a natural-language input specifying a modification to the conversational sequence; and
      apply a modification, based on a natural-language input specifying the modification to the conversational sequence, by:
         automatically determining coordinates for any new or moved node using a layout routine that enforces spatial separation;
         updating the corresponding node record; and
         storing a snapshot of the conversational sequence with an identifier in persistent storage.

19. The system of claim 18, wherein the node records are fixed-length node records and the coordinates are grid coordinates.

20. The system of claim 18, wherein the directed edges are stored as pairs of node identifiers.

21. The system of claim 18, wherein the layout routine comprises a force-directed solver that enforces a non-overlap constraint and Start-and-End anchor positions.

22. The system of claim 18, wherein rendering comprises re-rendering only a region of the viewport affected by the modification.

23. The system of claim 18, wherein graphics hardware is configured to draw only viewport-visible nodes.

24. The system of claim 18, wherein graphics hardware exposes viewport clipping leveraged by the rendering and re-rendering.

25. The system of claim 18, further comprising a network interface configured to replicate compressed JSON snapshots across multiple storage nodes using a consensus protocol.

\* \* \* \* \*